US012724886B2

(12) United States Patent
Bahassan et al.

(10) Patent No.: US 12,724,886 B2
(45) Date of Patent: Sep. 1, 2026

(54) COUNTERMEASURE REACTIONARY RESPONSE RELATED TO CHANGES IN THE IT ENVIRONMENT

(71) Applicant: SAUDI ARABIAN OIL COMPANY, Dhahran (SA)

(72) Inventors: Bedoor Bahassan, Dhahran (SA); Rahaf Alnufaiee, Dammam (SA); Tuqa Alaithan, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 72 days.

(21) Appl. No.: 18/824,210

(22) Filed: Sep. 4, 2024

(65) Prior Publication Data

US 2026/0064837 A1 Mar. 5, 2026

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS

| | | | |
|---|---|---|---|
| 10,320,813 B1 | 6/2019 | Ahmed et al. | |
| 10,855,706 B2 | 12/2020 | Choudhury et al. | |
| 12,225,026 B1 * | 2/2025 | Zhou | H04L 63/1416 |
| 2017/0063905 A1 | 3/2017 | Muddu et al. | |
| 2019/0041835 A1 * | 2/2019 | Cella | G06N 3/006 |
| 2022/0014542 A1 * | 1/2022 | Janakiraman | H04L 63/1433 |
| 2024/0098100 A1 | 3/2024 | Lal et al. | |
| 2024/0250936 A1 * | 7/2024 | Neumann | G06F 21/6245 |

(Continued)

FOREIGN PATENT DOCUMENTS

| | | | |
|---|---|---|---|
| CN | 106911669 B | 4/2020 | |
| WO | WO-2024151643 A1 * | 7/2024 | H04L 9/08 |

OTHER PUBLICATIONS

Guerra et al., "A Study on Labeling Network Hostile Behavior with Intelligent Interactive Tools," 2019 IEEE Symposium on Visualization for Cyber Security (VizSec), Vancouver, BC, Canada, pp. 1-10 (Year: 2019).*

(Continued)

*Primary Examiner* — Morshed Mehedi
(74) *Attorney, Agent, or Firm* — Osha Bergman Watanabe & Burton LLP

(57) ABSTRACT

A method and a system for intrusion detection and countermeasure reactionary response. The method may include obtaining, by the computer processor, a baseline of a cybersecurity environment and detecting a change in the cybersecurity environment. Further, the method includes performing a Long Short Term Memory (LSTM) analysis of the change to determine a frequency of the change, a plurality of affected parameters, and a nature of the change and determining a severity of the change based on a heatmap analysis of the frequency of the change and the LSTM analysis. A remediation command is generated based on the LSTM analysis and the severity of the change and the remediation command configured to adjust at least one configuration setting of a network is transmitted.

20 Claims, 8 Drawing Sheets

(56) References Cited

U.S. PATENT DOCUMENTS

| | | | | |
|---|---|---|---|---|
| 2025/0016520 | A1* | 1/2025 | Williams | A61B 5/7264 |
| 2025/0021657 | A1* | 1/2025 | Andriukhin | G06F 21/577 |
| 2025/0141896 | A1* | 5/2025 | Thomas | H04L 63/1433 |

OTHER PUBLICATIONS

Almazrouei et al., "A Review on Attack Graph Analysis for IoT Vulnerability Assessment: Challenges, Open Issues, and Future Directions," in IEEE Access, vol. 11, pp. 44350-44376, (Year: 2023).*

S. Shende, et al., "Long Short-Term Memory (LSTM) Deep Learning Method for Intrusion Detection in Network Security," International Journal of Engineering Research & Technology, 2020 (6 pages).

V. Ravi, et al., "Deep Learning for Cyber Security Applications: A Comprehensive Survey," Department of Corporate and Information Services, Northern Territory Government of Australia, 2021 (34 pages).

W. Nadeem, "Detecting and Mitigating Botnet Attacks Using Deep Learning in Software-Defined Networks," Thesis for Doctor of Philosophy Computer Science, Universiti Tunku Abdul Rahman, 2023 (221 pages).

Biswal, A., "Top 10 Deep Learning Algorithms You Should Know in 2023," Retrieved Sep. 4, 2024, from URL <<https://www.simplilearn.com/tutorials/deep-learning-tutorial/deep-learning-algorithm>>, 2024 (12 pages).

Analytics Insight, "How is Machine Learning being Developed to Prevent Phishing Attacks?," Analytics Insight, Data Science, Retrieved Sep. 4, 2024 from URL <<https://www.analyticsinsight.net/machine-learning-developed-prevent-phishing-attacks/>>, 2020 (2 pages).

C. Naidu, et al., "Using the power of machine learning to detect cyber attacks," Fintech News, Retrieved on Sep. 4, 2024 from URL <<https://www.fintechnews.org/using-the-power-of-machine-learning-to-detect-cyber-attacks/>> 2020 (3 pages).

* cited by examiner

COUNTERMEASURE REACTIONARY RESPONSE RELATED TO CHANGES IN THE IT ENVIRONMENT

BACKGROUND

Cybersecurity may include the protection of an organization's data and/or infrastructure from both outside threats and individuals within an organization that may compromise the data, cause denial of service, or perform other sort of attacks. In most IT environments, default settings are captured in a security baseline. The IT security solutions use baselines to check anomalies within the environment for compliance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method. The method includes obtaining, by the computer processor, a baseline of a cybersecurity environment and detecting a change in the cybersecurity environment. Further, the method includes performing a Long Short Term Memory (LSTM) analysis of the change to determine a frequency of the change, a plurality of affected parameters, and a nature of the change and determining a severity of the change based on a heatmap analysis of the frequency of the change and the LSTM analysis. A remediation command is generated based on the LSTM analysis and the severity of the change and the remediation command configured to adjust at least one configuration setting of a network is transmitted.

In general, in one aspect, embodiments disclosed herein relate to a system including a network comprising a plurality of network elements, a hardware probe coupled to the plurality of network elements, a software probe coupled to the plurality of network elements, and a computer processor, wherein the computer processor is coupled to the hardware probe, the software probe, and the plurality of network elements. Further, the computer processor comprises functionality for obtaining a baseline of a cybersecurity environment and detecting a change in the cybersecurity environment. Additionally, the computer processor comprises functionality for performing a Long Short Term Memory (LSTM) analysis of the change to determine a frequency of the change, a plurality of affected parameters, and a nature of the change and determining a severity of the change based on a heatmap analysis of the frequency of the change and the LSTM analysis. A remediation command is generated based on the LSTM analysis and the severity of the change and the remediation command configured to adjust at least one configuration setting of a network is transmitted.

In general, in one aspect, embodiments disclosed herein relate to a non-transitory computer readable medium storing a set of instructions executable by a computer processor. The set of instructions include the functionality for obtaining a baseline of a cybersecurity environment and detecting a change in the cybersecurity environment. Further, the set of instructions include the functionality for performing a Long Short Term Memory (LSTM) analysis of the change to determine a frequency of the change, a plurality of affected parameters, and a nature of the change and determining a severity of the change based on a heatmap analysis of the frequency of the change and the LSTM analysis. A remediation command is generated based on the LSTM analysis and the severity of the change and the remediation command configured to adjust at least one configuration setting of a network is transmitted.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

DETAILED DESCRIPTION

Figure 1:
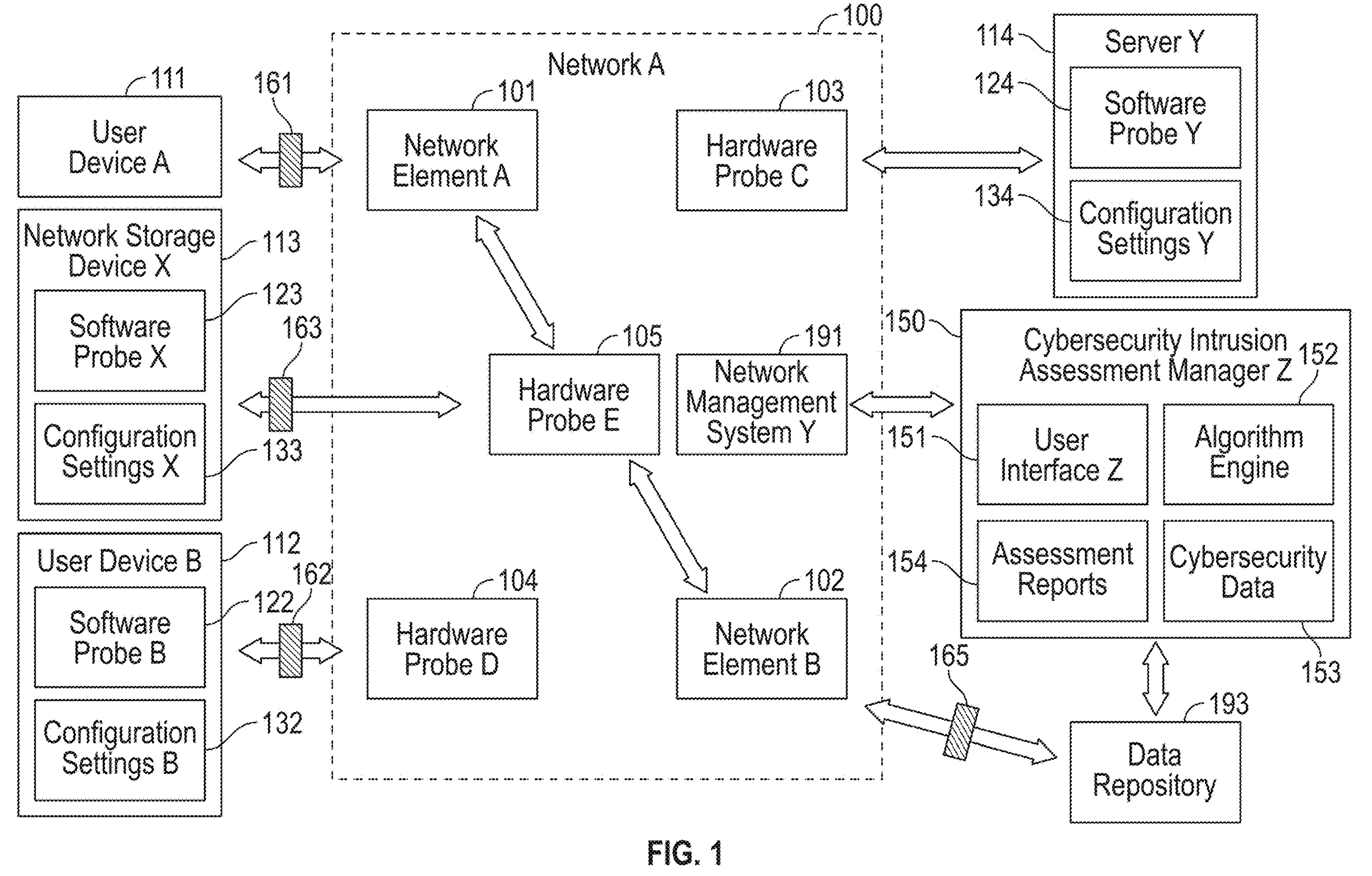
FIG. 1 shows a system in accordance with one or more embodiments.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "cybersecurity analysist" includes reference to one or more of such analysists.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and cybersecurity solution for intrusion detection and countermeasure reactionary response. The method operates by capturing changes in any IT environment and processing a comparison with the original state, using an anomaly detection method for the comparison. After the anomaly is detected, the software gathers information based on assessments done using machine learning. After assessing, the solution may alert cybersecurity analysts and conduct the required mitigations in parallel as the countermeasure reactionary response.

Further, the infrastructure may include communication infrastructure (such as cellular wireless network links or leased lines or satellite links), network infrastructure (such as switches, routers and links between them), computing infrastructure (such as servers and storage devices that include premises-based or cloud-based devices), and/or cybersecurity infrastructure (such as Firewalls, IDS, IPS, etc.). The endpoints may include user devices (e.g., PCs, mobile devices) or peripherals. Other organizational aspects may include the availability of approved cybersecurity strategies, policies, procedures and workforce certifications. For brevity, "infrastructure and endpoints" (or "network or organization") may be used hereinafter to imply the holistic scope mentioned above.

Furthermore, the embodiments disclosed herein monitor the activity of the infrastructure and endpoints and generate an intrusion assessment report or specific events that may be critical for the cybersecurity of the entire network. To perform cybersecurity monitoring and assurance, multiple hardware probes and multiple software probes may be disposed around a network in order to collect data for analyzing cybersecurity risks as well as to detect changes to the cybersecurity state of the network. For example, hardware probes may monitor inline network traffic as the data passes through particular nodes along a network path. On the other hand, software probes may be installed on various network elements to monitor configuration settings and other system data in order to provide a security picture of the infrastructure system or endpoints in a network. More specifically, a cybersecurity intrusion assessment may use one or more activity assessment models that provide a metric for analyzing specific cybersecurity areas of an organization as well as for determining an overall cybersecurity picture of the organization against one or more cybersecurity standards or frameworks. One or more embodiments include a cybersecurity intrusion assessment manager that provides an autonomous process that determines cybersecurity severity scores and compliance with security standards.

This method aims to solve the problem of illegitimate or unauthorized change detection and mitigation processes that are performed manually by cybersecurity analysts and therefore making the process slower and susceptible to human-induced errors. The solution aims to minimize this time-consuming and overly complicated process by automating the detection and mitigation. The versatility of the invention is another crucial aspect. It can be deployed either on-premises or as a cloud service, offering flexibility to organizations based on their specific needs. This deployment flexibility further reduces deployment complexity, implementation time, and assessment costs.

Additionally, this disclosure aims to detect changes that could lead to vulnerabilities or a possible exploit in a timely manner. In addition to speeding up the mitigation process, the method still offers the possibility of human intervention (i.e., by reviewing the presented workflow prior to applying the mitigation) to minimize errors generated by the proposed solution. Moreover, by utilizing the neural network algorithm to automate the detection, analysis, and mitigation process, it helps reduce the human error margin. Also, the solution is flexible and scalable as it may get more accurate by maximizing the inventory input that gets larger after each new documented case.

Further, this disclosure uses Long Short-Term Memory ("LSTM") to understand the environment to detect changes when they first occur by understanding the provided baselines and trigger the mitigation process. Also, the method maps the changes with known attacks to provide a holistic view of the environment's current state. The method uses heatmap representation of detected changes to ascertain the frequency of certain changes to eliminate false-positives. In addition, the solution utilizes a specialized inventory that has all known false positives customized for the corporate to increase accuracy. Moreover, the workflow process allows the cybersecurity analyst to change the steps or approve them to be applied.

Turning to FIG. 1, FIG. 1 shows a schematic diagram in accordance with one or more embodiments. As shown in FIG. 1, a network (e.g., network A (100)) may be coupled to various user devices (e.g., user device A (111), user device B (112)), one or more servers (e.g., server Y (114)), a network storage device (e.g., network storage device X (113)), various network elements (e.g., network element A (101), network element B (102)). A network element may refer to various hardware components within a network, such as switches, routers, and hubs, as well as user devices, servers, network storage devices, user equipment, or any other logical entities for uniting one or more physical devices on the network. User devices may include personal computers, smartphones, human machine interfaces, and any other devices coupled to a network that obtain inputs from one or more users. In some embodiments, a network includes a cybersecurity intrusion assessment manager (e.g., cybersecurity intrusion assessment manager Z (150)). The cybersecurity intrusion assessment manager Z (150) includes hardware and/or software that includes functionality for determining cybersecurity risks and/or remediating the cybersecurity risks, such as restarting network devices, performing connection tests, and implementing security protocols, etc. In some embodiments, a cybersecurity intrusion assessment manager, network elements, user equipment, user devices, servers, and/or a network storage device may be computing systems similar to the computing system (800) described in FIG. 8, and the accompanying description.

In some embodiments, a network includes a log system that obtains cybersecurity data using hardware probes (103-105), software probes (122-124), and the network management system (191). The log system obtains data from operating systems, firewalls, proxy, routers, modems, etc. These data sources are the sources from which cybersecurity data discussed herein is monitored/collected. As such, networks include one or more hardware probes (e.g., hardware probe C (103), hardware probe D (104), hardware probe E (105)). In particular, a hardware probe may include hardware that has functionality to monitor inline data transmissions, such as data sent between endpoints communicating over network paths or data sent between network elements as shown in hardware probe E (105). For example, hardware probe D (104) may perform a packet analysis on network data (162) that is transmitted by user device B (112) to server Y (114) to determine one or more security vulnerabilities or noncompliance with one or more security protocols. Thus, various hardware probes may collect network information regarding security control implementations, security protocols, and other types of security information directly from network traffic. Hardware probes may further transmit such network information (e.g., network information D (165) to a cybersecurity intrusion assessment manager for further analysis.

In some embodiments, for example, the cybersecurity intrusion assessment manager Z (150) includes functionality for receiving information from a data repository (193) containing configuration information regarding all network elements including information about the activity of the network elements. As such, a hardware probe may include hardware that performs a packet analysis to identify and categorize inbound and outbound running applications by monitoring network traffic. Thus, hardware probes determine a presence and/or violation of one or more security metrics through a packet analysis. In some embodiments, for example, a hardware probe detects any activity within a network element and transmits the information regarding the activity and the network element to the data repository (193). Thus, hardware probes may identify devices within a network and their respective cybersecurity risks based on analyzing network traffic.

In some embodiments, a network (e.g., network A (100)) includes one or more software probes. For example, a software probe may be software installed on a network element (e.g., software probe X (123), software probe B (122) on user device B (112), software probe Y (124)) for monitoring potential security vulnerabilities associated with the network element. For example, a software probe may include functionality to identify various configuration settings (e.g., configuration settings B (132), configuration settings X (133), configuration settings Y (134)), such as security controls, network communication settings, and/or various security protocols performed using the network element. In some embodiments, a software probe may compare configuration settings to one or more predetermined security policies, security controls, and/or baselines to identify compliance issues and other security vulnerabilities.

Returning to the cybersecurity intrusion assessment manager, the cybersecurity intrusion assessment manager Z (150) may include hardware and/or software that includes functionality for collecting cybersecurity data (e.g., cybersecurity data (153)) over a network using various hardware probes and software probes. In some embodiments, the cybersecurity intrusion assessment manager obtains cybersecurity data by interfacing and extracting information from other management systems in a network or among an organization's infrastructure. In particular, the cybersecurity intrusion assessment manager Z (150) may request information from a Data Repository (193), and a network management system (e.g., network management system Y (191)). In some embodiments, the cybersecurity intrusion assessment manager Z (150) is implemented in a cloud computing environment by a cloud server, where the cloud server may obtain the data from various probes over various internet connections. Where cybersecurity data may be generated by a cybersecurity intrusion assessment manager, in some embodiments, hardware probes and/or software probes may directly generate the cybersecurity data.

In some embodiments, the cybersecurity intrusion assessment manager Z (150) obtains user inputs from one or more user devices regarding activity of the network device, network interface card type, reservation status, switch port, asset details, or last scan time, physical location or the system name of the network element currently using the network. In some embodiments, a cybersecurity intrusion assessment manager includes hardware and/or software such as an algorithm engine (152) for analyzing data received from the network management system (191), and the Data Repository (193). This activity and availability assessment of the network elements may be based on one or more templates corresponding to a security standard, framework, or the original state of the system.

In some embodiments, the cybersecurity intrusion assessment manager Z (150) includes functionality for transmitting one or more remediation commands (e.g., remediation command (163)) based on one or more activity and availability assessment of the network elements. In particular, a remediation command may be a network message that causes one or more remediation procedures to be performed automatically by a network element. Examples of remediation procedures may include one or more of the following: performing connection tests to validate availability of the network element; changing configuration settings on a network element; removing a network connection; or adjusting a predetermined workflow or rule associated with a network protocol. In some embodiments, the cybersecurity intrusion assessment manager Z (150) includes a remediation queue that organizes the sequence that remediation procedures are implemented in a network. For example, a remediation action may be increasing level of logging and monitoring for systems that show signs of suspicious activity to gather more data for analysis.

In some embodiments, the cybersecurity intrusion assessment manager Z (150) includes hardware and/or software that provides a user interface (e.g., user interface Z (151)) to various user devices over a network or in a cloud computing environment. In particular, the user interface may provide parties with the capability to review the activity and availability assessment regarding network elements or an organization as a whole. Likewise, a user interface may receive inputs from a user, such as cybersecurity analysts, regarding cybersecurity risks and security protocols. In some embodiments, for example, a cybersecurity intrusion assessment manager may include software to provide a graphical user interface for presenting data and/or receiving commands to initiate remediation actions with a network.

Keeping with FIG. 1, the cybersecurity intrusion assessment manager Z (150) may include functionality for generating one or more assessment reports (e.g., assessment report M (161), assessment reports (154)) based on cybersecurity data. In particular, an assessment report may include the compliance metric of various elements and alert the administrator to investigate and fix the issue. In some embodiments, an assessment report includes changes in the network with respect to a particular measurement from a previous report.

Furthermore, an assessment report may indicate changes with respect to an overall cybersecurity assessment for a network or organization. Reports may also include updates regarding performance of current remediation procedures. Likewise, a cybersecurity intrusion assessment manager may store previous assessment reports (e.g., assessment reports (154) in a database, such as to compare and identify overall performance improvements at periodic intervals. Such assessment reports may be provided to user devices through a dashboard integration to a cybersecurity intrusion assessment manager's user interface.

Figure 2:
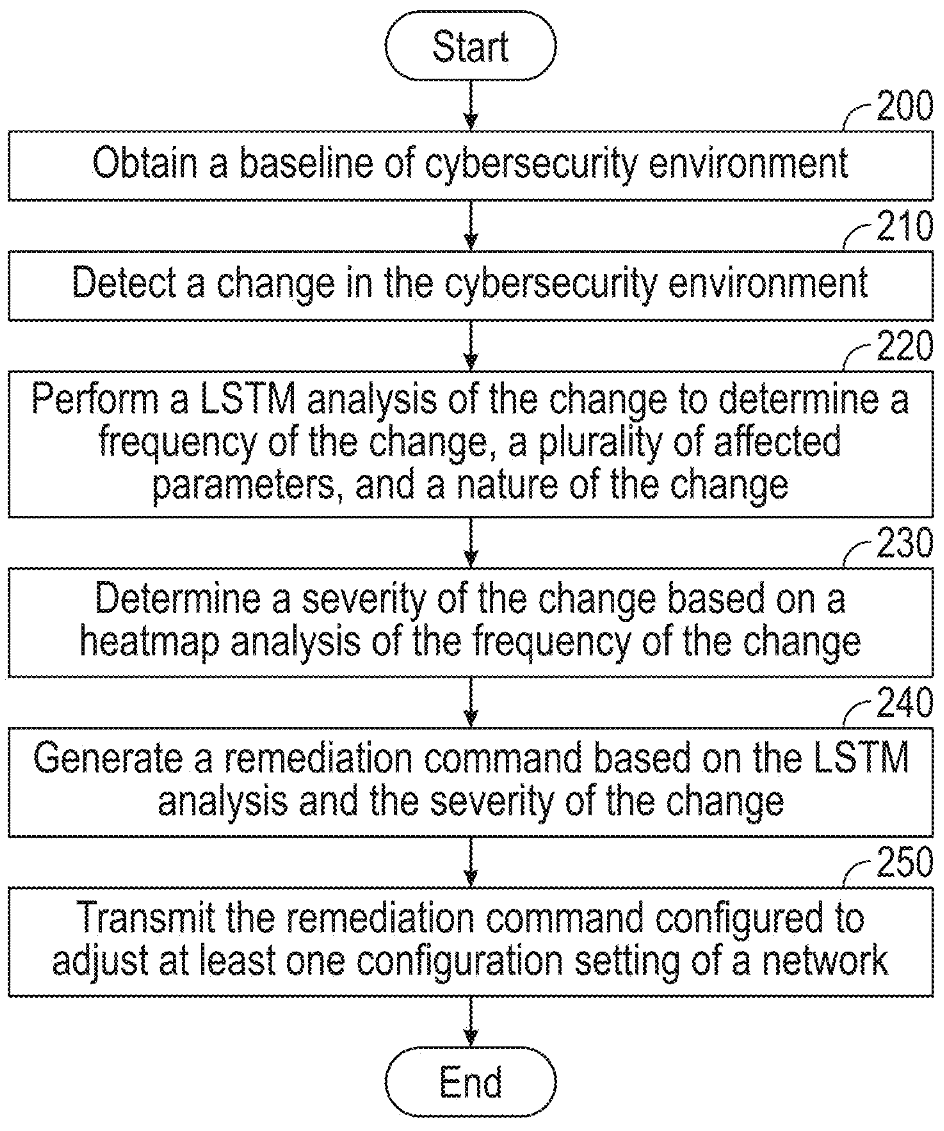
FIG. 2 shows a flowchart in accordance with one or more embodiments.

Turning to FIG. 2, FIG. 2 shows a flowchart in accordance with one or more embodiments. Specifically, FIG. 2 describes a general method for assessing the detected change in the cybersecurity environment. One or more blocks in FIG. 2 may be performed by one or more components (e.g., cybersecurity intrusion assessment manager (150)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, a baseline of a cybersecurity environment is obtained in accordance with one or more embodiments. The baseline of the cybersecurity environment is obtained by the cybersecurity intrusion assessment manager (150) and stored in the data repository (193). The baseline of a cybersecurity environment includes security measures and configurations of a cybersecurity infrastructure. The baseline of a cybersecurity environment may include a listing of all hardware, software, and data used within the environment. Further, the baseline of a cybersecurity environment may include documented security policies and procedures, access controls, versions and updates for software, firewalls, etc. The baseline of a cybersecurity environment may be periodically automatically collected by the cybersecurity intrusion assessment manager (150) using hardware and software probes. Additionally, the baseline of a cybersecurity environment may be uploaded to the data repository by a cybersecurity system operator after completing a task or when evaluating the compliance of a part of the system or system in general.

In Block 210, the cybersecurity intrusion assessment manager (150) monitors the baseline of a cybersecurity environment to detect a change within the baseline of a cybersecurity environment using a machine learning model. In one or more embodiments, Long Short-Term Memory (LSTM) may be preferred machine learning model. Specifically, the LSTM initially is trained to memorize the original state of the baseline of the cybersecurity environment. The machine learning model is trained to learn normal patterns and behavior of the data. The machine learning models may be specifically trained on relevant datasets to recognize patterns, relationships, and context within the received data. By leveraging machine learning the patterns that demand a deeper understanding of context and variations may be effectively evaluated.

Machine learning (ML), broadly defined, is the extraction of patterns and insights from data. The phrases "artificial intelligence," "machine learning," "deep learning," and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein. However, one skilled in the art will recognize that the concepts and methods detailed hereafter are not limited by this choice of nomenclature.

Machine-learned model types may include, but are not limited to, generalized linear models, Bayesian regression, random forests, and deep models such as neural networks, convolutional neural networks, and recurrent neural networks. Machine-learned model types, whether they are considered deep or not, are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameters surrounding a machine-learned model is referred to as selecting the model "architecture." Once a machine-learned model type and hyperparameters have been selected, the machine-learned model is trained to perform a task.

Figure 3:
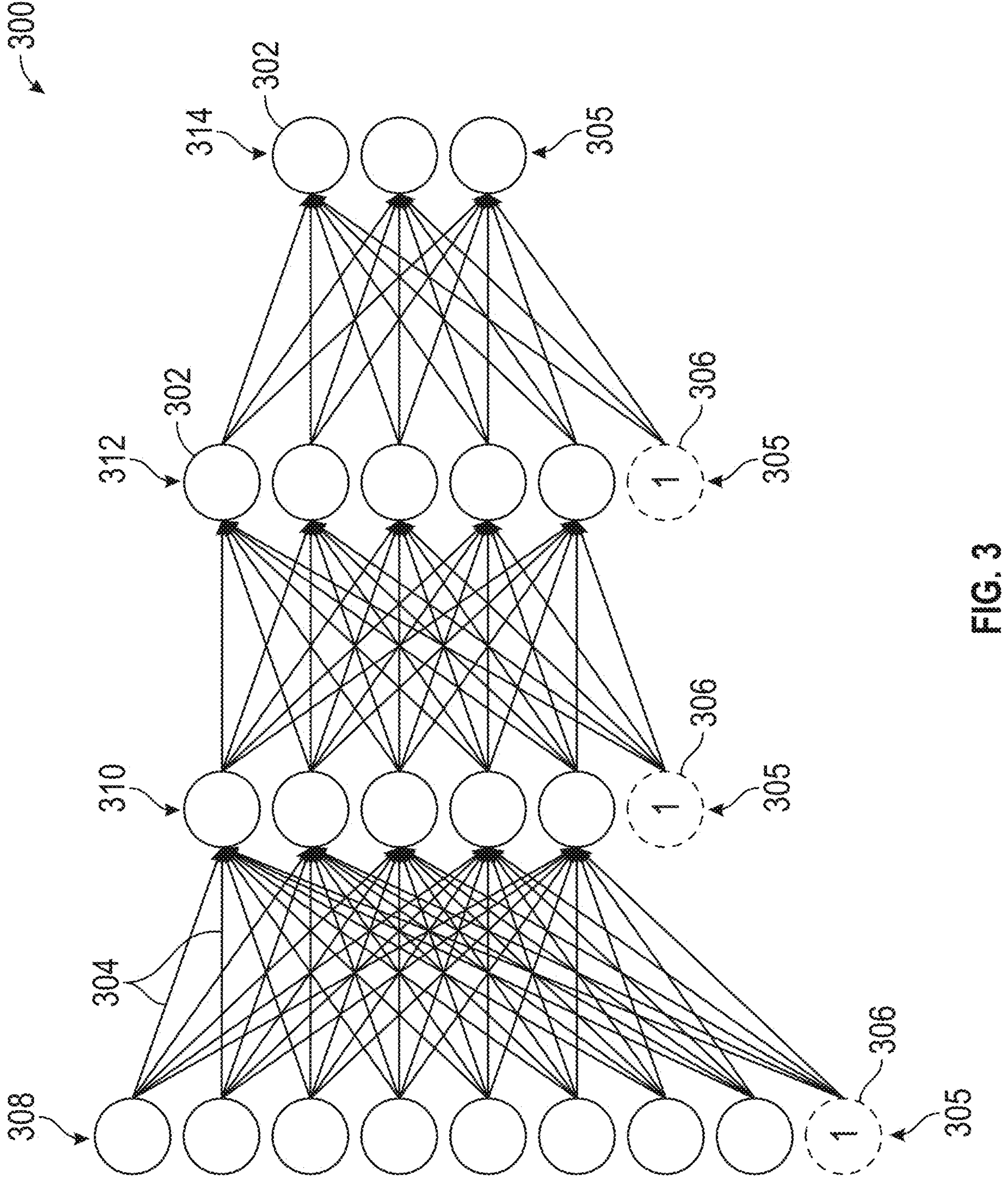
FIG. 3 shows a neural network in accordance with one or more embodiments.
Figure 4:
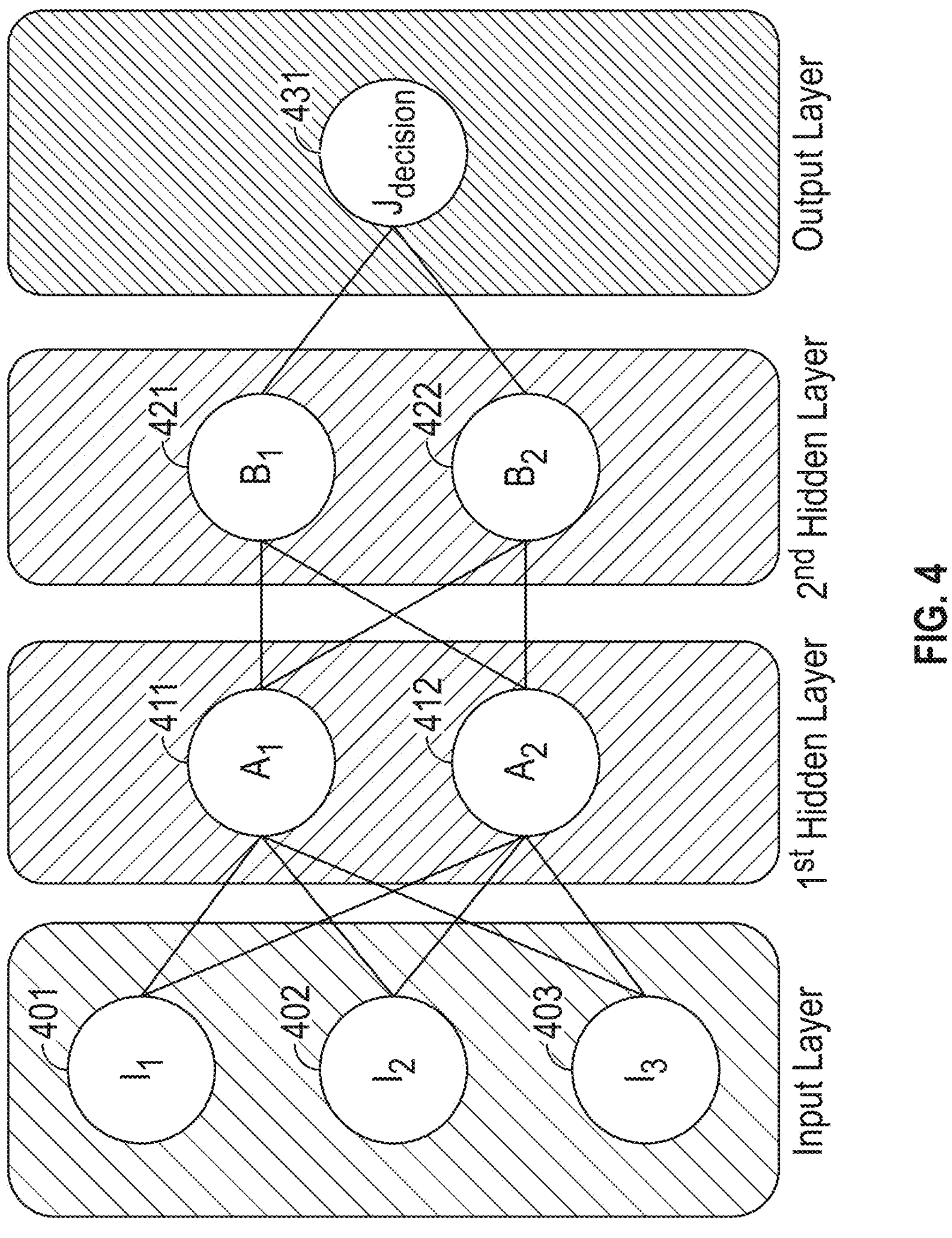
FIG. 4 shows an exemplary neural network in accordance with one or more embodiments.
Figure 5:
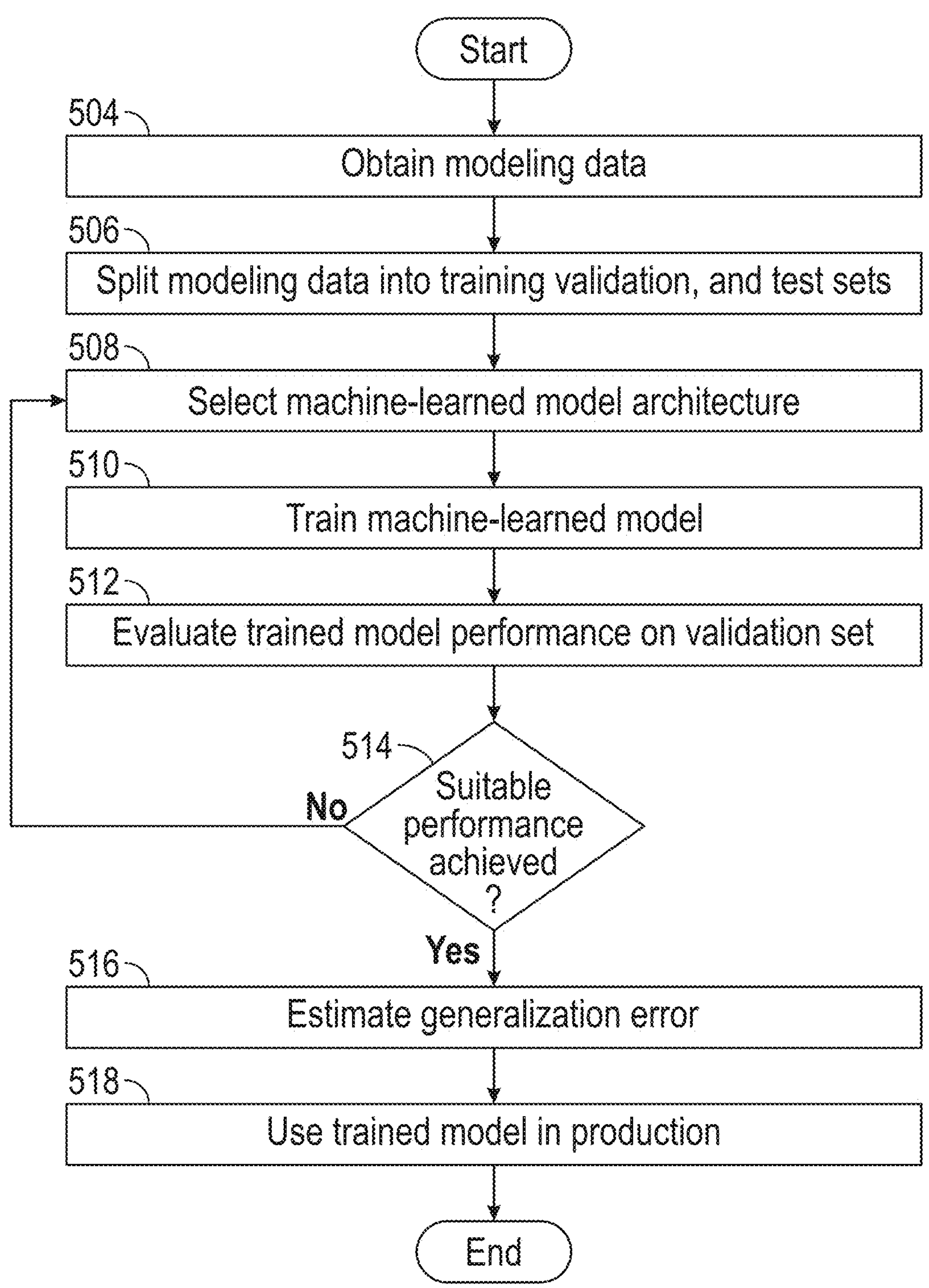
FIG. 5 shows a flowchart in accordance with one or more embodiments.

A cursory introduction to various machine-learned models such as a neural network (NN) is provided in FIGS. 3-5, as these models are often used as components—or may be adapted and/or built upon—to form more complex models such as autoencoders and diffusion models. However, it is noted that many variations of neural networks, convolutional neural networks, autoencoders, transformers, and diffusion models exist. Therefore, one with ordinary skill in the art will recognize that any variations to the machine-learned models that differ from the introductory models discussed herein may be employed without departing from the scope of this disclosure.

After the LSTM model learns the baseline of the cybersecurity environment, various hardware and software probes supply the cybersecurity intrusion assessment manager (150) with real-time data, including the traffic logs, system logs, user activity logs, and provide updates regarding documented security policies and procedures, access controls, versions and updates for software, firewalls, etc. The cybersecurity intrusion assessment manager (150) continuously compares the received data to the learned baseline to detect a potential change from the baseline of the cybersecurity environment.

In Block 220, the algorithm engine (152) analyzes the detected change using the LSTM model. More specifically, the algorithm engine (152), initially, processes the received data to compute the frequency of the detected change, the parameters affected by the detected change. Further, the algorithm engine (152) correlates the detected change with relevant attacks from the resolution inventory, where the resolution inventory is a database where actions related to the previously detected changes are stored. Additionally, the algorithm engine (152) determines the nature of the change.

In Block 230, the algorithm engine (152) determines the severity of the change based on a heatmap analysis and the LSTM analysis. The heatmap analysis is used to recognize the frequency of changes happening to different components of the cybersecurity environment. The LSTM analysis is coupled to the heatmap analysis to understand the nature of the change. The nature of the change may be classified as normal or abnormal.

The normal changes include, at least, routine system updates (i.e., regular software patches and updates scheduled by the IT department), scheduled maintenance (i.e., pre-planned maintenance activities that include system reboots, application of the patches, hardware replacements), and configuration adjustments (i.e., documented and approved adjustments made to system settings as part of ongoing optimization efforts).

The abnormal changes include, at least, unauthorized access attempts (i.e., instances where unknown users or systems try to gain access to the IT environment), unexpected configuration changes (i.e., changes made to system settings or configurations that were not planned or approved), and indicators of compromise (i.e., activities such as unusual file modifications, unexpected network traffic, or anomalies in user behavior that suggest a potential security breach).

The detected changes that are normal for the cybersecurity environment are added to the false-positives inventory and may be assigned a Level 1 or low severity level. The baseline is updated to reflect the detected change. Additionally, the more frequent changes (i.e., daily changes) may also be assigned the Level 1 or low severity level. The less frequent changes may indicate abnormalities and be assigned more severe levels. Further, LSTM evaluates the impact that the detected changes may have on the environment. The severity level may be determined based on the evaluated impact and the frequency of the change and assigned severity levels such as Level 1 or low, Level 2 or medium, Level 3 or high, Level 4 or severe, and Level 5 or emergency.

In Block 240, the cybersecurity intrusion assessment manager (150) generates a remediation command based on the LSTM analysis and the severity of the change. When the cybersecurity intrusion assessment manager (150) is triggered for an unauthorized change to one of the systems baseline values, a matrix is created with all changes cross-referenced with previously-analyzed attacks to determine a type of attack. The matrix may be a pre-compiled matrix of known cyber-attacks and may be stored in a resolution inventory. The matrix may further include data about different known cyber-attacks, signatures of known cyber-attacks, and behavior of known cyber-attacks. The cross-referencing process includes checking whether the detected change matches any known attack patterns in terms of its characteristics and behavior.

Before applying the remediation command, the cybersecurity intrusion assessment manager (150) checks whether the detected change occurred in the past by checking the historical logs to retrieve the remediation steps. If the detected change is a new activity, then a log will be created with the details, calculated severity, and mitigations taken from the resolution inventory. While the log is tracked or created, all involved security teams may be alerted. Further, LSTM triggers the bot that may reference the resolution inventory and produce a workflow of all the remediation steps and prompts the user to add or remove any necessary steps that the bot needs to consider before acting. In one or more embodiments, after the analyst approves the workflow, the bot will apply the mitigation.

In Block 250, one or more remediation commands are transmitted based on a severity score in accordance with one or more embodiments. In some embodiments, the cybersecurity intrusion assessment manager (150) may perform remediation monitoring and/or remediation procedures over a network. More specifically, the cybersecurity intrusion assessment manager (150) may track implementation of various remediation procedures, e.g., with a remediation queue, and determine the status of implementing a particular remediation procedure. For example, the cybersecurity intrusion assessment manager (150) may schedule different remediation procedures for different times and in a predetermined sequence. For example, this schedule may be controlled and/or adjusted using remediation commands. In some embodiments, a remediation command is similar to the remediation commands described above in FIG. 1 and the accompanying description.

Accordingly, a network element may transmit remediation data to the cybersecurity intrusion assessment manager (150). For example, remediation data may provide a status update regarding one or more remediation procedures being performed on the network element. Thus, in some embodiments, a remediation procedure is performed autonomously using a cybersecurity intrusion assessment manager (150). Likewise, one or more severity scores may be updated in response to determining the completion of a remediation procedure. A cybersecurity maturity manager may further update a cybersecurity assessment of a network or network element without conducting a full assessment again based completion of the remediation procedure. The cybersecurity intrusion assessment manager (150) may also conduct the incremental assessment as required for specific control standards identified as a gap during the full assessment.

In one or more embodiments, the remediation commands may include reverting unauthorized changes to the previous state to mitigate a potential risk, isolating the affected systems from the network to prevent the spread of potential malware or further unauthorized access, initiating comprehensive antivirus and antimalware scans to identify and remove malicious software, initiate application of necessary security patches to fix vulnerabilities exploited during the attack, blocking malicious IP addressed identified during the attacks to prevent future access, locking compromised user accounts and initiating password resets to enforce a secure access, generating a detailed incident report that includes all findings, performed actions, and recommendation for future preventions, etc.

In one or more embodiments, the cybersecurity intrusion assessment manager (150) generates a comprehensive report that provides valuable insights into status of the detected change. The report is designed to offer a clear and detailed overview of areas of success and areas that require improvement. Additionally, the report includes specific recommendations for future similar attacks.

FIG. 3 shows a diagram of a neural network. At a high level, a neural network (300) may be graphically depicted as being composed of nodes (302), where any circle represents a node, and edges (302), shown here as directed lines. The nodes (302) may be grouped to form layers (305). FIG. 3 displays four layers (308, 310, 312, 314) of nodes (302) where the nodes (302) are grouped into columns, however, the grouping need not be as shown in FIG. 3. The edges (302) connect the nodes (302). Edges (302) may connect, or not connect, to any node(s) (302) regardless of which layer (305) the node(s) (302) is in. That is, the nodes (302) may be sparsely and residually connected. A neural network (300) will have at least two layers (305), where the first layer (308) is considered the "input layer" and the last layer (314) is the "output layer." Any intermediate layer (310, 312) is usually described as a "hidden layer." A neural network (300) may have zero or more hidden layers (310, 312) and a neural network (300) with at least one hidden layer (310, 312) may be described as a "deep" neural network or as a "deep learning method." In general, a neural network (300) may have more than one node (302) in the output layer (314). In this case the neural network (300) may be referred to as a "multi-target" or "multi-output" network.

Nodes (302) and edges (302) carry additional associations. Namely, every edge is associated with a numerical value. The edge numerical values, or even the edges (302) themselves, are often referred to as "weights" or "parameters." While training a neural network (300), numerical values are assigned to each edge (302). Additionally, every node (302) is associated with a numerical variable and an activation function. Activation functions are not limited to any functional class, but traditionally follow the form $$A = f\left(\sum_{i\in(incoming)} [(\text{node value})_i (\text{edge value})_i]\right), \tag{2}$$

where i is an index that spans the set of "incoming" nodes (302) and edges (302) and $f$ is a user-defined function. Incoming nodes (302) are those that, when viewed as a graph (as in FIG. 3), have directed arrows that point to the node (302) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (302) in a neural network (300) may have a different associated activation function. Often, as a shorthand, activation functions are described by the function $f$ by which it is composed. That is, an activation function composed of a linear function $f$ may simply be referred to as a linear activation function without undue ambiguity.

When the neural network (300) receives an input, the input is propagated through the network according to the activation functions and incoming node (302) values and edge (302) values to compute a value for each node (302). That is, the numerical value for each node (302) may change for each received input. Occasionally, nodes (302) are assigned fixed numerical values, such as the value of 1, that are not affected by the input or altered according to edge (302) values and activation functions. Fixed nodes (302) are often referred to as "biases" or "bias nodes" (306), displayed in FIG. 3 with a dashed circle.

In some implementations, the neural network (300) may contain specialized layers (305), such as a normalization layer, or additional connection procedures, like concatenation. One skilled in the art will appreciate that these alterations do not exceed the scope of this disclosure.

As noted, the training procedure for the neural network (300) comprises assigning values to the edges (304). To begin training the edges (304) are assigned initial values. These values may be assigned randomly, assigned according to a prescribed distribution, assigned manually, or by some other assignment mechanism. Once edge (304) values have been initialized, the neural network (300) may act as a function, such that it may receive inputs and produce an output. As such, at least one input is propagated through the neural network (300) to produce an output. Training data is provided to the neural network (300). Generally, training data consists of pairs of inputs and associated targets. The targets represent the "ground truth," or the otherwise desired output, upon processing the inputs. During training, the neural network (300) processes at least one input from the training data and produces at least one output. Each neural network (300) output is compared to its associated input data target. The comparison of the neural network (300) output to the target is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (300) output and the associated target. The loss function may also be constructed to impose additional constraints on the values assumed by the edges (304), for example, by adding a penalty term, which may be physics-based, or a regularization term. Generally, the goal of a training procedure is to alter the edge (304) values to promote similarity between the neural network (300) output and associated target over the training data. Thus, the loss function is used to guide changes made to the edge (304) values, typically through a process called "backpropagation."

While a full review of the backpropagation process exceeds the scope of this disclosure, a brief summary is provided. Backpropagation consists of computing the gradient of the loss function over the edge (304) values. The gradient indicates the direction of change in the edge (304) values that results in the greatest change to the loss function. Because the gradient is local to the current edge (304) values, the edge (304) values are typically updated by a "step" in the direction indicated by the gradient. The step size is often referred to as the "learning rate" and need not remain fixed during the training process. Additionally, the step size and direction may be informed by previously seen edge (304) values or previously computed gradients. Such methods for determining the step direction are usually referred to as "momentum" based methods.

Once the edge (304) values have been updated, or altered from their initial values, through a backpropagation step, the neural network (300) will likely produce different outputs. Thus, the procedure of propagating at least one input through the neural network (300), comparing the neural network (300) output with the associated target with a loss function, computing the gradient of the loss function with respect to the edge (304) values, and updating the edge (304) values with a step guided by the gradient, is repeated until a termination criterion is reached. Common termination criteria are reaching a fixed number of edge (304) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (304) values are no longer intended to be altered, the neural network (300) is said to be "trained."

One or more embodiments disclosed herein employ a convolutional neural network (CNN). A CNN is similar to a neural network (300) in that it can technically be graphically represented by a series of edges (304) and nodes (302) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. Grid data, which may be three-dimensional, has such a structural relationship because each data element, or grid point, in the grid data has a spatial location (and sometimes also a temporal location when grid data is allowed to change with time). Consequently, a CNN is an intuitive choice for processing grid data.

A structural grouping, or group, of weights is herein referred to as a "filter". The number of weights in a filter is typically much less than the number of inputs, where here the number of inputs refers to the number of data elements or grid points in a set of grid data. In a CNN, the filters can be thought as "sliding" over, or convolving with, the inputs to form an intermediate output or intermediate representation of the inputs which still possesses a structural relationship. Like the neural network (300), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. In some instances, the structural relationship of the final intermediate representations is ablated; a process known as "flattening." The flattened representation may be passed to a neural network (300) to produce a final output. Note, that in this context, the neural network (300) is still considered part of the CNN. Like a neural network (300), a CNN is trained, after initialization of the filter weights, and the edge (304) values of the internal neural network (300), if present, with the backpropagation process in accordance with a loss function.

A common architecture for CNNs is the so-called "U-net." The term U-net is derived because a CNN after this architecture is composed of an encoder branch and a decoder branch that, when depicted graphically, often form the shape of the letter "U." Generally, in a U-net type CNN the encoder branch is composed of N encoder blocks and the decoder branch is composed of N decoder blocks, where $N \geq 1$. The value of N may be considered a hyperparameter that can be prescribed by user or learned (or tuned) during a training and validation procedure. Typically, each encoder block and each decoder block consist of a convolutional operation, followed by an activation function and the application of a pooling (i.e., downsampling) or upsampling operation. Further, in a U-net type CNN each of the N encoder and decoder blocks may be said to form a pair. Intermediate data representations output by an encoder block may be passed to, and often concatenated with other data, an associated (i.e., paired) decoder block through a "skip" connection or "residual" connection.

Another type of machine-learned model is a transformer. A detailed description of a transformer exceeds the scope of this disclosure. However, in summary, a transformer may be said to be deep neural network capable of learning context among data features. Generally, transformers act on sequential data (such as a sentence where the words form an ordered sequence). Transformers often determine or track the relative importance of features in input and output (or target) data through a mechanism known as "attention." In some instances, attention mechanism may further be specified as "self-attention" and "cross-attention," where self-attention determines the importance of features of a data set (e.g., input data, intermediate data) relative to other features of the data set. For example, if the data set is formatted as a vector with M elements, then self-attention quantifies a relationship between the M elements. In contrast, cross-attention determines the relative importance of features to each other between two data sets (e.g., an input vector and an output vector). Although transformers generally operate on sequential data composed of ordered elements, transformers do not process the elements of the data sequentially (such as in a recurrent neural network) and require an additional mechanism to capture the order, or relative positions, of data elements in a given sequence. Thus, transformers often use a positional encoder to describe the position of each data element in a sequence, where the positional encoder assigns a unique identifier to each position. A positional encoder may be used to describe a temporal relationship between data elements (i.e., time series) or between iterations of a data set when a data set is processed iteratively (i.e., representations of a data set at different iterations). While concepts such as attention and positional encoding were generally developed in the context of a transformer, they may be readily inserted into—and used with—other types of machine-learned models (e.g., diffusion models).

Turning to reinforcement learning, a simulator may perform one or more reinforcement learning algorithms using a reinforcement learning system to train a machine-learning model. In particular, a reinforcement learning algorithm may be a type of method that autonomously learns agent policies through multiple iterations of trials and evaluations based on observation data. The objective of a reinforcement learning algorithm may be to learn an agent policy $\pi$ that maps one or more states of an environment to an action so as to maximize an expected reward $J(\pi)$. A value reward may describe one or more qualities of a particular state, agent action, and/or trajectory at particular time within an operation, such as an electric power generation operation. As such, a reinforcement learning system may include hardware and/or software with functionality for implementing one or more reinforcement learning algorithms. For example, a reinforcement learning algorithm may train a policy to make a sequence of decisions based on the observed states of the environment to maximize the cumulative reward determined by a reward function. For example, a reinforcement learning algorithm may employ a trial-and-error procedure to determine one or more agent policies based on various agent interactions with a complex environment, such as a geological subsurface with various geological interfaces and different formations. As such, a reinforcement learning algorithm may include a reward function that teaches a particular action selection engine to follow certain rules, while still allowing the reinforcement learning model to retain information learned from previous simulations.

In some embodiments, one or more components in a reinforcement learning system are trained using a training system. For example, an agent policy and/or a reward function may be updated through a training process that is performed by a machine-learning algorithm. In some embodiments, historical data, augmented data, and/or synthetic data may provide a supervised signal for training an action selector engine, an agent policy, and/or a reward function, such as through an imitation learning algorithm. In another embodiment, an interactive expert may provide data for adjusting agent policies and/or reward functions.

In one or more embodiments, an imitation learning model, which is part of the reinforced learning models, may be a preferred machine learning model. The imitation learning model instead of trying to learn from the sparse rewards or manually specifying a reward function, an expert (e.g., operator) provides the model with a set of demonstrations. The agent then tries to learn the optimal policy by imitating the expert's decisions. The main component of the imitation learning model is the environment, which is essentially a Markov Decision Process (MDP). Specifically, the environment has an S set of states, an A set of actions, a P (s'|s, a) transition model, describing a probability that an action, a, in the state, s, leads to state s', and an unknown R(s, a) reward function. The agent performs different actions in this environment based on its π policy. Finally, the loss function and the learning algorithm are two main components, in which the various imitation learning methods differ from each other.

Turning to FIG. 4, FIG. 4 shows an exemplary neural network. More specifically, FIG. 4 shows an analysis performed on the detected change using the LSTM model. In one or more embodiments, the LSTM includes a neural network containing three neurons in the input layer. The neurons are I1 (401), I2 (402), and I3 (403), where I1 contains information regarding the baseline cybersecurity environment in which the detected change is detected, I2 contains the change that was detected in the environment, and I2 contains the number of changes.

Further, the neural network has two hidden layers for computational purposes. Specifically, the first hidden layer contains two neurons A1 (411) and A2 (412), where A1 computes the frequency of the change over a given period of time and A1 determines the impacted configuration parameters affected by the change.

Regarding the second hidden layer, the second hidden layer contains two neurons B1 (421) and B2 (422) responsible for more complex operations. Specifically, B1 determines the nature of the change, where the nature of the change may be normal or abnormal. The nature of the change is determined based on the cybersecurity environment in which the change was detected. The B2 neuron correlates the detected change with a previously-encountered cyber-attack. The output layer J (431) determines whether the detected change poses a threat and whether the system is part of an active attack.

FIG. 5 depicts a general framework for training and evaluating a machine-learned model. Herein, when training a machine-learned model, the more general term "modeling data" will be adopted as opposed to training data to refer to data used for training, evaluating, and testing a machine-learned model. Further, use of the term modeling data prevents ambiguity when discussing various partitions of modeling data such as a training set, validation set, and test set, described below. In the context of FIG. 5, modeling data will be said to consist of pairs of inputs and associated targets. When a machine-learned model is trained using pairs of inputs and associated targets, that machine-learned model is typically categorized as a "supervised" machine-learned model or a supervised method. In the literature, autoencoders are often categorized as "unsupervised" or "semi-supervised" machine learning models because modeling data used to train these models does not include distinct targets. For example, in the case of autoencoders, the output, and thus the desired target, of an autoencoder is the input. That said, while autoencoders may not be considered supervised models, the training procedure depicted in FIG. 5 may still be applied to train autoencoders where it is understood that an input-target pair is formed by setting the target equal to the input.

Keeping with FIG. 5, in Block 504, modeling data is obtained. As stated, the modeling data may be acquired from historical datasets, be synthetically generated, or may be a combination of real and synthetic data. In Block 506, the modeling data is split into a training set, validation set, and test set. In one or more embodiments, the validation and the test set are the same such that the modeling data is effectively split into a training set and a validation/testing set. In Block 508, given the machine-learned model type (e.g., autoencoder) an architecture (e.g., number of layers, compression ratio, etc.) are selected. In accordance with one or more embodiments, architecture selection is performed by cycling through a set of user-defined architectures for a given model type. In other embodiments, the architecture is selected based on the performance of previously evaluated models with their associated architectures, for example, using a Bayesian-based search. In Block 510, with an architecture selected, the machine-learned model is trained using the training set. During training, the machine-learned model is adjusted such that the output of the machine-learned model, upon receiving an input, is similar to the associated target (or, in the case of an autoencoder, the input). Once the machine-learned model is trained, in Block 512, the validation set is processed by the trained machine-learned model and its outputs are compared to the associated targets. Thus, the performance of the trained machine-learned model can be evaluated. Block 514 represents a decision. If the trained machine-learned model is found to have suitable performance as evaluated on the validation set, where the criterion for suitable performance is defined by a user, then the trained machine-learned model is accepted for use in a production (or deployed) setting. As such, in Block 518, the trained machine-learned model is used in production. However, before the machine-learned model is used in production a final indication of its performance can be acquired by estimating the generalization error of the trained machine-learned model, as shown in Block 516. The generalization error is estimated by evaluating the performance of the trained machine-learned model, after a suitable model has been found, on the test set. One with ordinary skill in the art will recognize that the training procedure depicted in FIG. 5 is general and that many adaptations can be made without departing from the scope of the present disclosure. For example, common training techniques, such as early stopping, adaptive or scheduled learning rates, and cross-validation may be used during training without departing from the scope of this disclosure.

Figure 6:
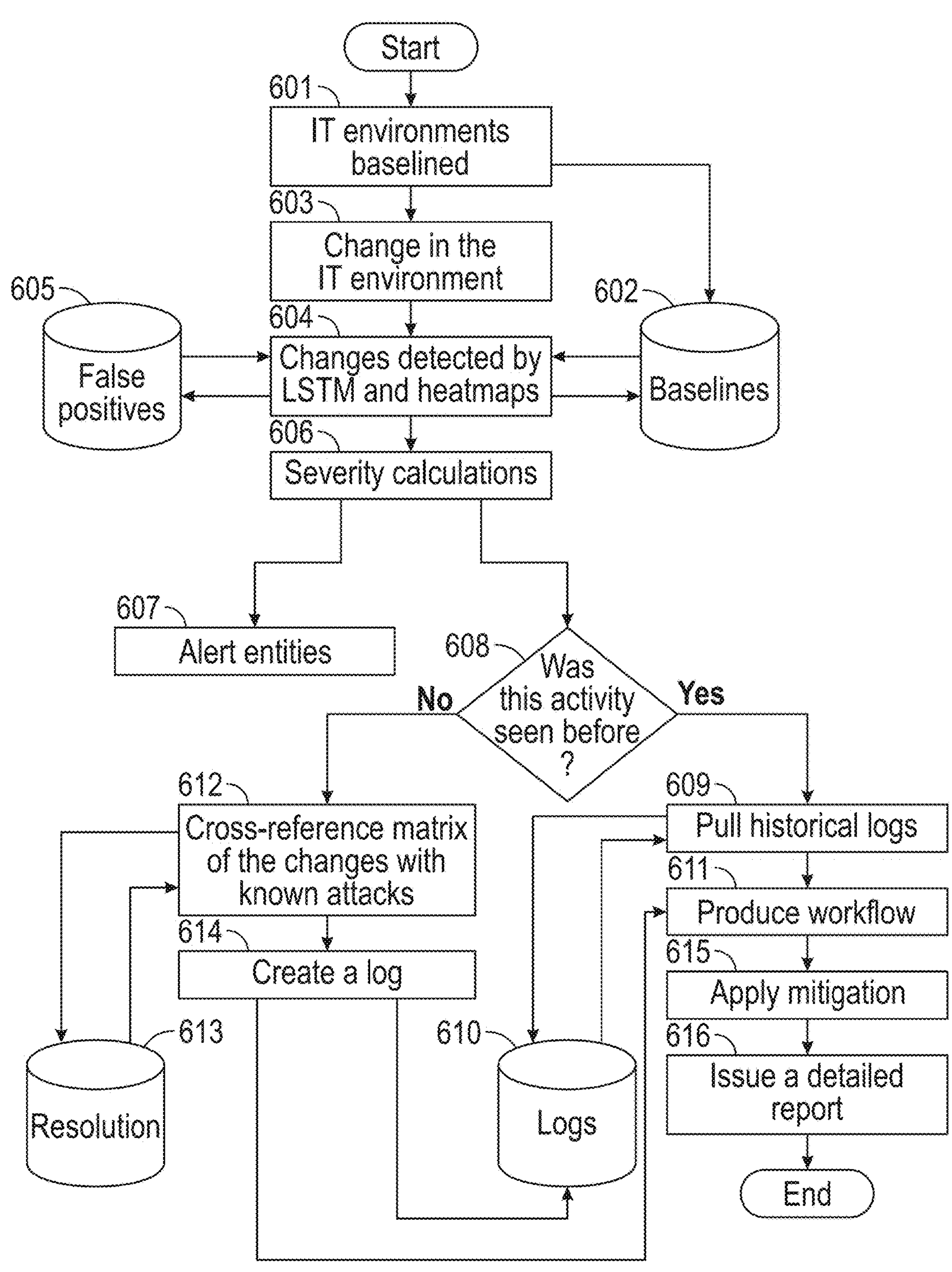
FIG. 6 shows an exemplary system in accordance with one or more embodiments.

Turning to FIG. 6, FIG. 6 shows a flowchart in accordance with one or more embodiments. Specifically, FIG. 6 describes a specific method for assessing the detected change in the cybersecurity environment. One or more blocks in FIG. 6 may be performed by one or more components (e.g., cybersecurity intrusion assessment manager (150)) as described in FIG. 1. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 601, a baseline of a cybersecurity environment is obtained in accordance with one or more embodiments.

The baseline of the cybersecurity environment is obtained by the cybersecurity intrusion assessment manager (150). The baseline of a cybersecurity environment includes security measures and configurations of a cybersecurity infrastructure. The baseline of a cybersecurity environment may be periodically automatically collected by cybersecurity intrusion assessment manager (150) using hardware and software probes. The baseline of a cybersecurity environment is stored in a baseline inventory in Block 602.

In Block 603, the cybersecurity intrusion assessment manager (150) is monitoring the baseline of a cybersecurity environment to detect a change within the baseline of a cybersecurity environment using a Long Short-Term Memory (LSTM) machine learning model. Specifically, the LSTM initially is trained to memorize the original state of the baseline of the cybersecurity environment and to compare the detected changes to the original state of the baseline.

In Block 604, the cybersecurity intrusion assessment manager (150) analyses the detected change using the LSTM and heatmaps. The heatmap analysis is used to recognize the frequency of changes happening to different components of the cybersecurity environment. The LSTM analysis is coupled to the heatmap analysis to understand the nature of the change. The nature of the change may be classified as normal or abnormal.

In Block 605, the detected changes that are classified as normal are stored in the false-positives repository. The false-positives inventory is used as a reference by cybersecurity intrusion assessment manager (150) to provide more accuracy and to reduce future false positives. Specifically, the heatmaps may be used to ascertain the frequency of certain changes to eliminate false positives. Additionally, the cybersecurity intrusion assessment manager (150) allows the cybersecurity analyst to change the steps or approve them to be applied.

In Block 606, the cybersecurity intrusion assessment manager (150) calculates the severity of the detected changes using the LSTM and heatmaps. Specifically, the LSTM includes a neural network containing three neurons in the input layer. The neurons contain information regarding the baseline cybersecurity environment in which the detected change is detected, the change that was detected in the environment, and the number of changes, respectively.

Further, the neural network has two hidden layers for computational purposes. Specifically, the first hidden layer computes the frequency of the change over a given period of time and determines the impacted configuration parameters affected by the change. Further, the second hidden layer determines the nature of the change, where the nature of the change may be normal or abnormal and correlates the detected change with a previously encountered cyber-attack. The output layer determines whether the detected change poses a threat and whether the system is part of an active attack.

The detected changes that are normal for the cybersecurity environment may be assigned a Level 1 or low severity level. Additionally, the more frequent changes (i.e., daily changes) may also be assigned the Level 1 or low severity level. The less frequent changes may indicate abnormalities and be assigned more severe levels. Further, LSTM evaluates the impact that the detected changes may have on the environment. The severity level may be determined based on the evaluated impact and the frequency of the change and assigned severity levels such as Level 1 or low, Level 2 or medium, Level 3 or high, Level 4 or severe, and Level 5 or emergency.

In Block 607, after a detected change has been detected and classified the cybersecurity intrusion assessment manager (150) alerts the analysts of the on-going change with the mapped cyber-attack and mitigation. The alert may be presented as a workflow of the detection process. In one or more embodiments, the process may request the analysis approval before continuing the process.

In Block 608, a determination is made on whether the detected change was encountered before. If the detected change has been encountered before, in Block 609 the cybersecurity intrusion assessment manager (150) obtains the historical logs from the historical logs repository in Block 610. In Block 611, the detected change is correlated to the previously generated workflow.

In one or more embodiments, when a determination is made that the detected change has not been encountered before, in Block 612 a cross-reference matrix of changes with known attacks is generated. The cross-reference matrix is made by accessing data stored in a resolution inventory in Block 613. More specifically, cybersecurity intrusion assessment manager (150) builds a model of mitigating controls and reactionary counter-measures. The resolution inventory may be built using a scalable database filled with recommended resolutions for well-known cyber-attacks. Subsequently, the data may be cleansed by clustering each attack for further clarity. To have more accurate data, the cybersecurity intrusion assessment manager (150) may have the flexibility to use API calls to fetch data from known libraries or other databases that contain information about various attacks and their corresponding resolutions. Additionally, the cybersecurity analysts may have the option to add and/or remove entries of resolutions of attacks, security configurations, and vulnerabilities to have further control in the resolution inventory. Additionally, in Block 614 a log is created to include the generated countermeasure reactionary response plan.

Figure 7:
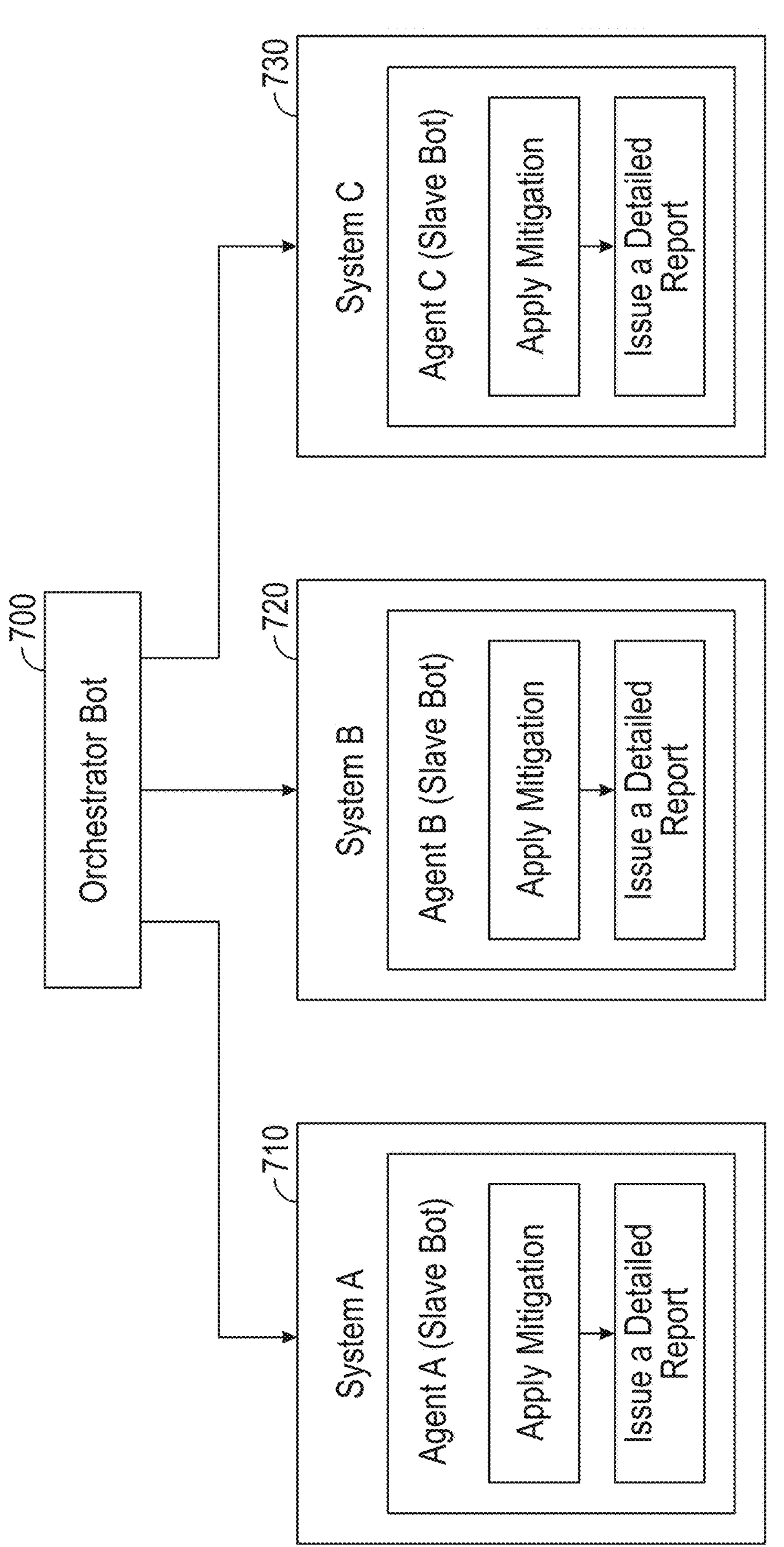
FIG. 7 shows a bot system in accordance with one or more embodiments.

In one or more embodiments, after the countermeasure reactionary response plan has been produced, in Block 615, the cybersecurity intrusion assessment manager (150) triggers the bot to execute the mitigation. As shown in FIG. 7, within each monitored system (710, 720, and 730), a dedicated agent (i.e., a Slave Bot) may be installed to carry on any required remediation steps given by a bot orchestrator (700), which is controlled by the cybersecurity intrusion assessment manager (150). The cybersecurity intrusion assessment manager (150) distributes the task jobs to each designated agent to execute the actual mitigation. Once the entire process is completed, in Block 616 the bot creates a report containing all the details of the event and applied mitigation and shared with concerned parties.

Figure 8:
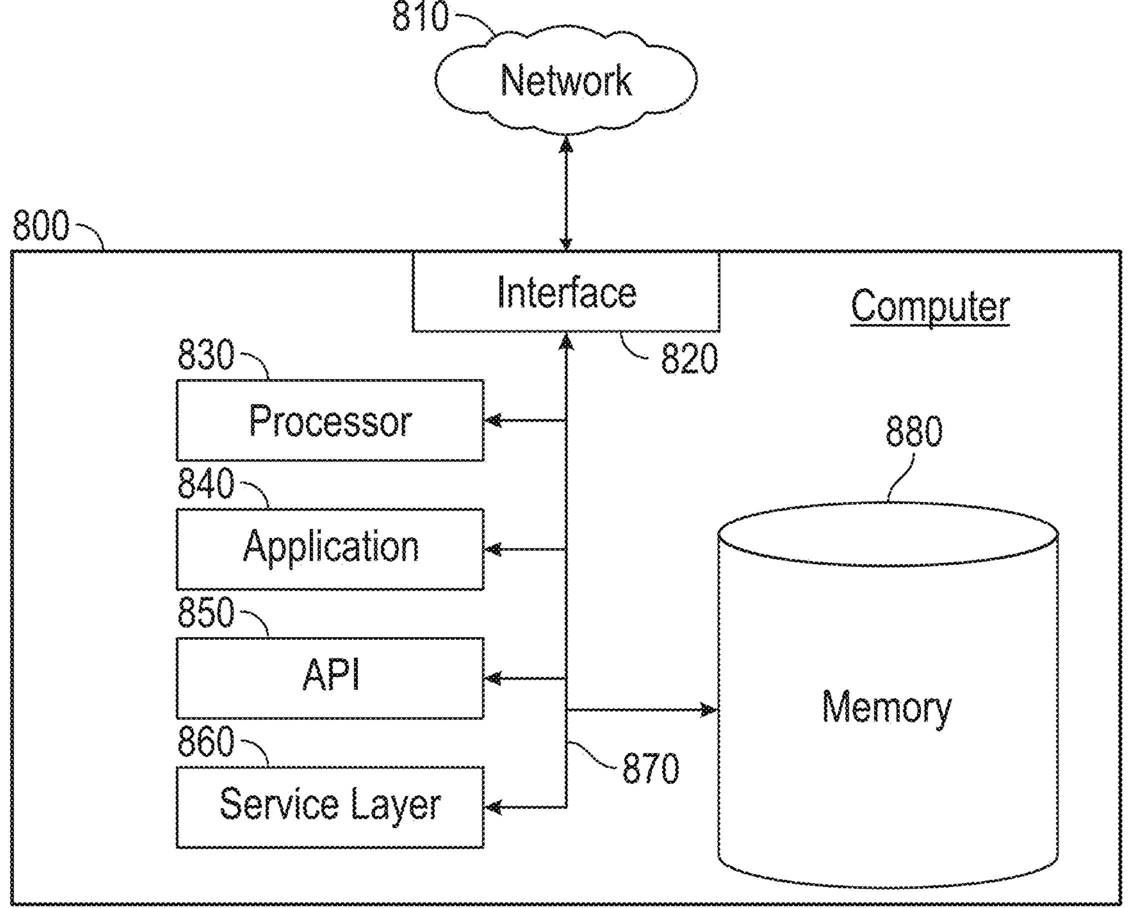
FIG. 8 shows a computing system in accordance with one or more embodiments.

Embodiments may be implemented on any suitable computing device, such as the computer system shown in FIG. 8. Specifically, FIG. 8 is a block diagram of a computer system (800) used to provide computational functionalities associated with described algorithms, methods, functions, processes, flows, and procedures as described in the instant disclosure, according to an implementation. The illustrated computer (800) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (800) may include a computer that includes an input device, such as a keypad, keyboard, touch screen, or other device that can accept user information, and an output device that conveys information associated with the operation of the computer (800), including digital data, visual, or audio information (or a combination of information), or a GUI.

The computer (800) can serve in a role as a client, network component, a server, a database or other persistency, or any other component (or a combination of roles) of a computer system for performing the subject matter described in the instant disclosure. The illustrated computer (800) is communicably coupled with a network (810). In some implementations, one or more components of the computer (800) may be configured to operate within environments, including cloud-computing-based, local, global, or other environment (or a combination of environments).

At a high level, the computer (800) is an electronic computing device operable to receive, transmit, process, store, or manage data and information associated with the described subject matter. According to some implementations, the computer (800) may also include or be communicably coupled with an application server, e-mail server, web server, caching server, streaming data server, business intelligence (BI) server, or other server (or a combination of servers).

The computer (800) can receive requests over network (810) from a client application (for example, executing on another computer (800) and responding to the received requests by processing the said requests in an appropriate software application. In addition, requests may also be sent to the computer (800) from internal users (for example, from a command console or by other appropriate access method), external or third-parties, other automated applications, as well as any other appropriate entities, individuals, systems, or computers.

Each of the components of the computer (800) can communicate using a system bus (870). In some implementations, any or all of the components of the computer (800), both hardware or software (or a combination of hardware and software), may interface with each other or the interface (820) (or a combination of both) over the system bus (870) using an application programming interface (API) (840) or a service layer (860) (or a combination of the API (850) and service layer (860). The API (850) may include specifications for routines, data structures, and object classes. The API (850) may be either computer-language independent or dependent and refer to a complete interface, a single function, or even a set of APIs. The service layer (860) provides software services to the computer (800) or other components (whether or not illustrated) that are communicably coupled to the computer (800). The functionality of the computer (800) may be accessible for all service consumers using this service layer. Software services, such as those provided by the service layer (860), provide reusable, defined business functionalities through a defined interface. For example, the interface may be software written in JAVA, C++, or other suitable language providing data in extensible markup language (XML) format or another suitable format. While illustrated as an integrated component of the computer (800), alternative implementations may illustrate the API (850) or the service layer (860) as stand-alone components in relation to other components of the computer (800) or other components (whether or not illustrated) that are communicably coupled to the computer (800). Moreover, any or all parts of the API (850) or the service layer (860) may be implemented as child or sub-modules of another software module, enterprise application, or hardware module without departing from the scope of this disclosure.

The computer (800) includes an interface (820). Although illustrated as a single interface (820) in FIG. 8, two or more interfaces (820) may be used according to particular needs, desires, or particular implementations of the computer (800). The interface (820) is used by the computer (800) for communicating with other systems in a distributed environment that are connected to the network (810). Generally, the interface (820 includes logic encoded in software or hardware (or a combination of software and hardware) and operable to communicate with the network (810). More specifically, the interface (820) may include software supporting one or more communication protocols associated with communications such that the network (810) or interface's hardware is operable to communicate physical signals within and outside of the illustrated computer (800).

The computer (800) includes at least one computer processor (830). Although illustrated as a single computer processor (830) in FIG. 8, two or more processors may be used according to particular needs, desires, or particular implementations of the computer (800). Generally, the computer processor (830) executes instructions and manipulates data to perform the operations of the computer (800) and any algorithms, methods, functions, processes, flows, and procedures as described in the instant disclosure.

The computer (800) also includes a memory (880) that holds data for the computer (800) or other components (or a combination of both) that can be connected to the network (810). For example, memory (880) can be a database storing data consistent with this disclosure. Although illustrated as a single memory (880) in FIG. 8, two or more memories may be used according to particular needs, desires, or particular implementations of the computer (800) and the described functionality. While memory (880) is illustrated as an integral component of the computer (800), in alternative implementations, memory (880) can be external to the computer (800).

The application (840) is an algorithmic software engine providing functionality according to particular needs, desires, or particular implementations of the computer (800), particularly with respect to functionality described in this disclosure. For example, application (840) can serve as one or more components, modules, applications, etc. Further, although illustrated as a single application (840), the application (840) may be implemented as multiple applications (840) on the computer (800). In addition, although illustrated as integral to the computer (800), in alternative implementations, the application (840) can be external to the computer (800).

There may be any number of computers (800) associated with, or external to, a computer system containing computer (800), each computer (800) communicating over network (810). Further, the term "client," "user," and other appropriate terminology may be used interchangeably as appropriate without departing from the scope of this disclosure. Moreover, this disclosure contemplates that many users may use one computer (800), or that one user may use multiple computers (800).

In some embodiments, the computer (800) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (Saas), mobile "backend" as a service (MBaaS), serverless computing, artificial intelligence (AI) as a service (AIaaS), and/or function as a service (FaaS).

Embodiments disclosed herein may exhibit the following advantages. Disclosed is a method and cybersecurity solution for intrusion detection and countermeasure reactionary response, by capturing the changes in any IT environment and processing a comparison with the original state, using an anomaly detection method for the comparison, and once the anomaly is detected, the software gathers information based on assessments done by using machine learning and data mining methods. After assessing, the solution alerts cybersecurity analysts and conduct the required mitigations in parallel as the countermeasure reactionary response.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, applied to a computer processor, comprising:
- obtaining, by the computer processor, a baseline of a cybersecurity environment;
- detecting, by the computer processor, a change in the cybersecurity environment;
- performing, by the computer processor, a Long Short Term Memory (LSTM) analysis of the change to determine a frequency of the change, a plurality of affected parameters, and a nature of the change;
- determining, by the computer processor, a severity of the change based on a heatmap analysis of the frequency of the change and the LSTM analysis;
- generating, by the computer processor, a remediation command based on the LSTM analysis and the severity of the change; and
- transmitting, by the computer processor, the remediation command configured to adjust at least one configuration setting of a network.

2. The method of claim 1, further comprising:
- performing, by the computer processor, a comparison between the detected change and previously detected changes; and
- generating, by the computer processor, a cross-reference matrix, where the cross-reference matrix includes previously-known cyberattacks.

3. The method of claim 1, wherein the nature of the change may be normal or abnormal.

4. The method of claim 3, wherein the detected changes with the normal nature of the change are added to a false positive repository.

5. The method of claim 1, wherein a bot orchestrator is used to apply the remediation command and to report a result of the remediation command.

6. The method of claim 1, wherein the severity of the change is higher for low frequency changes.

7. The method of claim 3, wherein the remediation command is configured to adjust the at least one configuration setting of the network is transmitted when the nature of the change is abnormal.

8. A system, comprising:
- a network comprising a plurality of network elements;
- a hardware probe coupled to the plurality of network elements;
- a software probe coupled to the plurality of network elements; and
- a computer processor, wherein the computer processor is coupled to the hardware probe, the software probe, and the plurality of network elements, and wherein the computer processor comprises functionality for:
  - obtaining a baseline of a cybersecurity environment;
  - detecting a change in the cybersecurity environment;
  - performing a Long Short-Term Memory (LSTM) analysis of the change to determine a frequency of the change, a plurality of affected parameters, and a nature of the change;
  - determining a severity of the change based on a heatmap analysis of the frequency of the change and the LSTM analysis;
  - generating a remediation command based on the LSTM analysis and the severity of the change; and
  - transmitting the remediation command configured to adjust at least one configuration setting of the network.

9. The system of claim 8, wherein the computer processor further comprises functionality for:
- performing a comparison between the detected change and previously detected changes; and
- generating a cross-reference matrix, where the cross-reference matrix includes previously-known cyberattacks.

10. The system of claim 8, wherein the nature of the change may be normal or abnormal.

11. The system of claim 10, wherein the detected changes with the normal nature of the change are added to a false positive repository.

12. The system of claim 9, wherein a bot orchestrator is used to apply the remediation command and to report a result of the remediation command.

13. The system of claim 9, wherein the severity of the change is higher for low frequency changes.

14. The system of claim 9, wherein the remediation command is configured to adjust the at least one configuration setting of the network is transmitted when the nature of the change is abnormal.

15. A non-transitory computer readable medium storing instructions executable by a computer processor, the instructions comprising functionality for:
- obtaining a baseline of a cybersecurity environment;
- detecting a change in the cybersecurity environment;
- performing a Long Short-Term Memory (LSTM) analysis of the change to determine a frequency of the change, a plurality of affected parameters, and a nature of the change;
- determining a severity of the change based on a heatmap analysis of the frequency of the change and the LSTM analysis;
- generating a remediation command based on the LSTM analysis and the severity of the change; and
- transmitting the remediation command configured to adjust at least one configuration setting of a network.

16. The non-transitory computer readable medium of claim 15, wherein the instructions further comprise functionality for:
- performing a comparison between the detected change and previously detected changes; and
- generating a cross-reference matrix, where the cross-reference matrix includes previously-known cyberattacks.

17. The non-transitory computer readable medium of claim 15, wherein the nature of the change may be normal or abnormal.

18. The non-transitory computer readable medium of claim 17, wherein the detected changes with the normal nature of the change are added to a false positive repository.

19. The non-transitory computer readable medium of claim 15, wherein a bot orchestrator is used to apply the remediation command and to report a result of the remediation command.

20. The non-transitory computer readable medium of claim 15, wherein the remediation command is configured to adjust the at least one configuration setting of the network is transmitted when the nature of the change is abnormal.

* * * * *